Feb. 24, 1970     D. J. COUGHENOUR ET AL     3,497,834
SONIC DELAY LINE USING LONGITUDINAL PRESSURE WAVES
TO EXCITE SLOWER TRANSVERSE WAVES IN A MEMBRANE
Filed Sept. 12, 1967
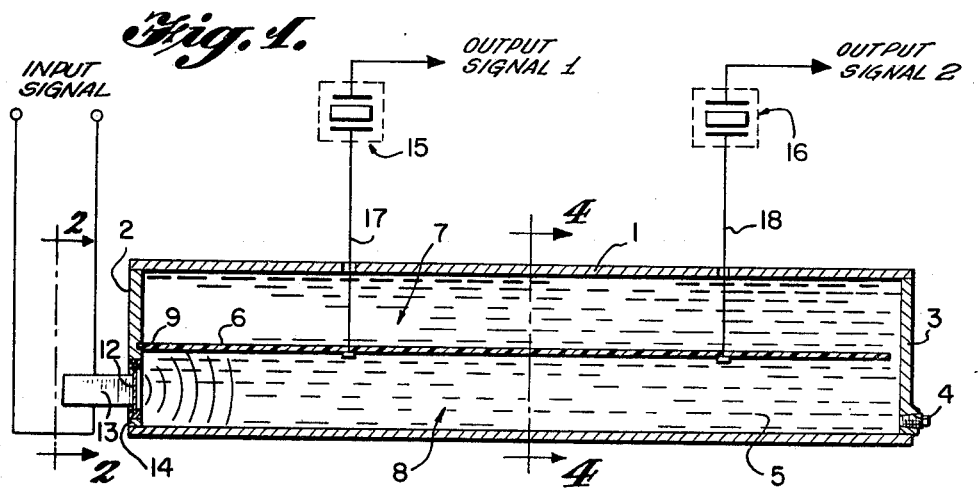
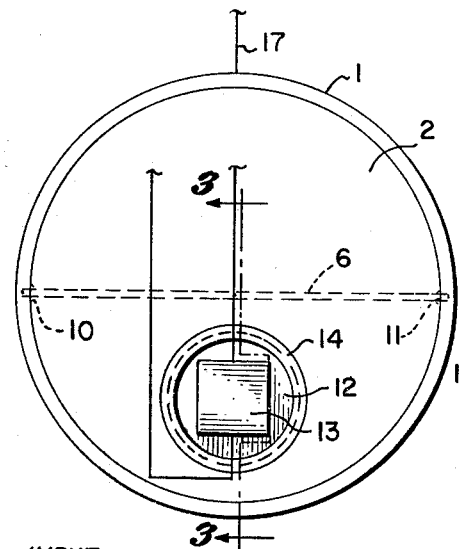
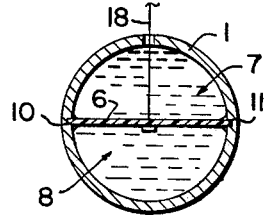
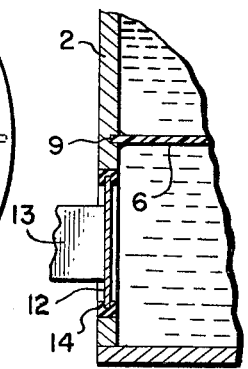
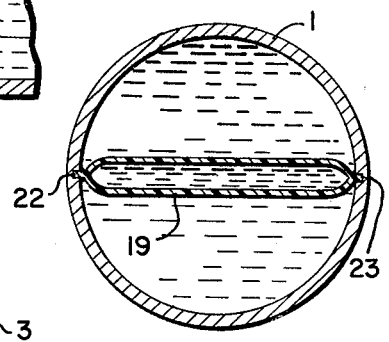
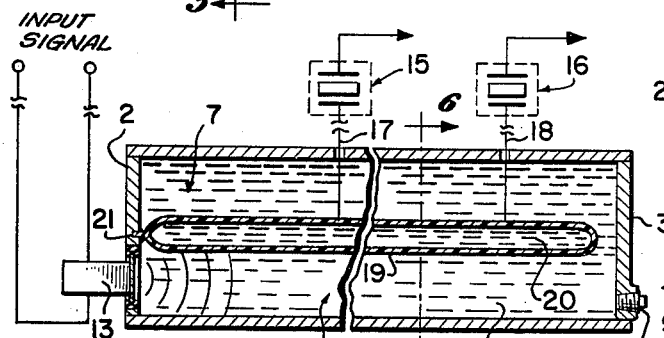
INVENTOR
Donald J. Coughenour
& Wayne A. Burnett
BY
Brady, O'Boyle & Gates
ATTORNEYS United States Patent Office 3,497,834
Patented Feb. 24, 1970

3,497,834
SONIC DELAY LINE USING LONGITUDINAL PRESSURE WAVES TO EXCITE SLOWER TRANSVERSE WAVES IN A MEMBRANE
Donald J. Coughenour, Morristown, N.J., and Wayne A. Burnett, State College, Pa., assignors to HRB-Singer, Inc., State College, Pa., a corporation of Delaware
Filed Sept. 12, 1967, Ser. No. 667,282
Int. Cl. H03h 7/30
U.S. Cl. 333—30      6 Claims

ABSTRACT OF THE DISCLOSURE

A sonic delay line assembly wherein an input signal transmits longitudinal pressure waves through a liquid filled tube to a membrane positioned in the tube and having an output transducer coupled thereto, whereby the membrane converts the longitudinal pressure waves to slower transverse waves thereby delaying the signal transmitted from the transducer.

BACKGROUND OF THE INVENTION

In signal analysis, it is often necessary to delay a portion of the signal for a specific period of time. If a long delay time is required, it has been proposed to either increase the transit path of the signal, or to transmit the signal through a relatively short transit path having a medium contained therein characterized by slow wave propagation properties. The use of the short transit path, rather than the long transit path, is usually employed because a more compact delay line assembly is provided. In these assemblies, an input signal, usually an electrical waveform, is transduced to acoustical energy which is transmitted through a liquid, solid or gaseous medium, the acoustical energy being transformed back into electrical energy at an output transducer.

While the above-noted delay line assembly has been satisfactory for its intended purpose, it has been subject to certain disadvantages in that the desired delay times possible for acoustic propagation depended upon the medium employed, the delay time per unit length for solids being 5 microseconds per inch; for liquids, 16 microseconds per inch, and gases 12 milliseconds per inch. Thus, when a long delay time was required, it was necessary to employ a gas as the medium, since liquids or solids could only render relatively short delay times.

The delay line assembly of the present invention has been devised to provide a relatively long delay time per unit length which could not heretofore be obtained by delay line assemblies employing liquid, solid or gaseous mediums.

SUMMARY OF THE INVENTION

The delay line of the present invention comprises, essentially, a liquid filled tube having a longitudinally extending membrane positioned therein and coincident with the longitudinal axis of the tube, whereby the tube is divided into two sections. One end of the membrane is secured to an end wall of the tube and the lateral edges of the membrane are secured to diametrically opposed side wall portions of the tube. An input transducer is connected to the end wall of the liquid filled tube and communicates with one of the liquid filled sections in the tube, and an output transducer is coupled to the membrane, whereby when the input transducer transmits an acoustical signal, an input compressional wave is propagated through the liquid thereby creating a difference in pressure in the liquid on either side of the membrane. This differential pressure provides the energy for driving the membrane which, in turn, energizes the output transducer coupled thereto.

By the construction and arrangement of the delay line assembly of the present invention, the longitudinal compressional waves propagated through the liquid are converted to transverse waves on the membrane which are propagated at velocities much slower than heretofore obtained by other delay line assemblies.

BRIEF DESCRIPTION OF THE DRAWING

FIGURE 1 is a sectional side elevational view of one embodiment of the delay line assembly of the present invention;

FIGURE 2 is an enlarged end view of the assembly taken along line 2—2 of FIGURE 1;

FIGURE 3 is a fragmentary sectional view taken along line 3—3 of FIGURE 2;

FIGURE 4 is a sectional view taken along line 4—4 of FIGURE 1;

FIGURE 5 is a sectional side elevational view illustrating another embodiment of the delay line assembly of the present invention; and FIGURE 6 is an enlarged sectional view taken along line 6—6 of FIGURE 5.

DESCRIPTION OF THE PREFERRED EMBODIMENTS

Referring to the drawings and more particularly to FIGURE 1, the sonic delay line assembly of the present invention comprises, a tubular housing 1 closed at each end by walls 2 and 3, end wall 3 having a plugged aperture 4 through which the tube may be filled with a suitable liquid 5, such as water. A thin elastic membrane 6 is mounted within the tube and is coincident with the longitudinal axis thereof, whereby the liquid filled tube is divided into an upper section 7 and a lower section 8. One end of the membrane is secured to end wall 2 as at 9 and the opposite end of the membrane is spaced from end wall 3. As will be seen in FIGURE 4, the lateral edges of the membrane are secured as at 10 and 11 to diametrically opposed wall portions of the tube.

Referring to FIGURES 1, 2 and 3, an aluminum diaphragm 12, having an electro-mechanical transducer 13 secured to the center thereof, is mounted within an aperture formed in the lower end portion of wall 2, the diaphragm being acoustically insulated from the end wall by a suitable gasket 14 mounted within the aperture. A pair of output electro-mechanical transducers 15 and 16 are coupled to the membrane 6 by threads 17 and 18, respectively. By this construction and arrangement, the transducer 13, coupled to the diaphragm 12, generates a longitudinal pressure wave in the lower section 8 of the liquid filled tube, thereby creating a pressure differential between the liquid in the lower section and the upper section 7. This pressure differential produces a transverse wave, propagated at a relatively slow velocity, on the membrane 6, to thereby energize the transducers 15 and 16.

In actual tests, delays on the order of 0.5 millisecond per inch in the frequency range of 200 to 400 c.p.s. were produced by a delay line assembly constructed in accordance with FIGURES 1 to 4, wherein a .015 inch thick Saran membrane was mounted within a water filled tube, 6 inches in diameter and 72 inches long. The delay time was measured by applying pulsed bursts of a single frequency to the input terminals of the transducer 13. The output signal from each of the transducers 15 and 16 was displayed on a dual beam oscilloscope from which was read the time it took any one pulse to travel the distance between transducers 15 and 16. From a measurement of the distance between transducers 15 and 16, the delay time per unit length was calculated.

The wave propagation velocity on the membrane is represented by the following equation:

$$c = \sqrt{\frac{2T}{M + \sqrt{M^2 + \frac{4b^2 p T(S_1+S_2)}{w^2 S_1 S_2}}}}$$

where

T=tension per unit length on membrane
M=mass per unit length of membrane
b=membrane width
p=density of liquid
$S_1$=cross-sectional area of tube on one side of membrane
$S_2$=cross-sectional area of tube on other side of membrane
w=angular frequency.

From the above equation it will be noted that various parameters are available for controlling the delay times; for instance, if the tension on the membrane is increased the delay is decreased, and as the width b and the ratio $(S_1+S_2)/S_1S_2$ is increased the delay increases. Therefore, to generate large delay times a relatively wide, massive membrane having negligible elasticity should be used so that $w^2M$ is much larger than the elasticity. The tension along the length of the membrane should also be made as small as possible.

One of the methods by which the mass of the membrane can be increased for increasing the delay times, is illustrated in FIGURES 5 and 6, wherein the membrane 6 is replaced by a membrane 19 encapsulating a liquid 20, the membrane being secured to the end wall and side wall portions of the tube as at 21, 22 and 23, respectively.

While water has been disclosed as the liquid 5 for filling the tube 1, other liquids can be employed so long as they do not chemically attack the component elements of the assembly; also, liquids with greater densities will produce longer delay times.

Similar delays can be generated by placing a liquid on one side of the membrane and a gas on the other side. The input and output transducers can be any one of several types of electro-mechanical transducers, such as, piezoelectric, magnetostrictive or moving coils, and the input signal can be introduced either above or below the membrane.

We claim:

1. A sonic delay line assembly of the character described comprising, a housing, said housing being filled with a liquid, membrane means mounted within said liquid-filled housing, input transducer means connected to said housing, and output transducer means connected to said membrane means, whereby pressure waves, having an initial velocity, are transmitted from the input transducer means through the liquid in the housing and are converted by the membrane means to waves having a slower velocity, thereby delaying the signal transmitted from the output transducer means.

2. A sonic delay line assembly according to claim 1, wherein the housing comprises a tubular member having walls closing each end thereof; said membrane means comprising, a thin, elastic, longitudinally extending membrane secured at one end to one of the end walls of the tubular member, the lateral edges of the membrane being secured to diametrically opposed wall portions of the tubular member.

3. A sonic delay line assembly according to claim 2 wherein a liquid is encapsulated by said membrane, whereby the mass of the membrane is increased to thereby further decrease the velocity of the waves propagated by the membrane.

4. A sonic delay line assembly according to claim 2 wherein said input transducer means comprises, an aperture formed in an end wall of the tubular member and communicating with the interior of the tubular member on one side of the membrane, a gasket mounted within said aperture, a diaphragm mounted within said gasket, and an electro-mechanical transducer secured to said diaphragm.

5. A sonic delay line assembly according to claim 2 wherein the output transducer means comprises, an electro-mechanical transducer coupled to the membrane by means of a thread.

6. A sonic delay line assembly according to claim 1 wherein the housing comprises, a tubular member having walls closing each end thereof; said membrane means comprising, a thin, elastic longitudinally extending membrane secured at one end to one of the end walls of the tubular member, the lateral edges of the membrane being secured to diametrically opposed wall portions of the tubular member, said membrane being coincident with the longitudinal axis of the tubular member to thereby divide the liquid-filled tubular member into two longitudinally extending portions, said input transducer means being connected to an end wall of the tubular member and communicating with one of the longitudinally extending liquid-filled portions, whereby longitudinal compressional waves transmitted from the input transducer means are converted to slower transverse waves on the membrane, thereby delaying the signal transmitted from the output transducer means.

References Cited

UNITED STATES PATENTS

| | | |
|---|---|---|
| 2,063,944 | 12/1936 | Pierce. |
| 2,063,945 | 12/1936 | Pierce _____ 181—31 |
| 2,608,623 | 8/1952 | Cutler et al. _____ 333—30 X |
| 2,837,914 | 6/1958 | Caldwell _____ 73—69 X |
| 3,347,335 | 10/1967 | Watters et al. _____ 181—.5 |

HERMAN KARL SAALBACH, Primary Examiner

WM. H. PUNTER, Assistant Examiner

U.S. Cl. X.R.

181—.5; 340—14